Nov. 19, 1968    L. R. FULTON    3,411,825
DUMP-BODY ACCESSORY FOR PICK-UP TRUCK
Filed Jan. 20, 1967    3 Sheets-Sheet 1
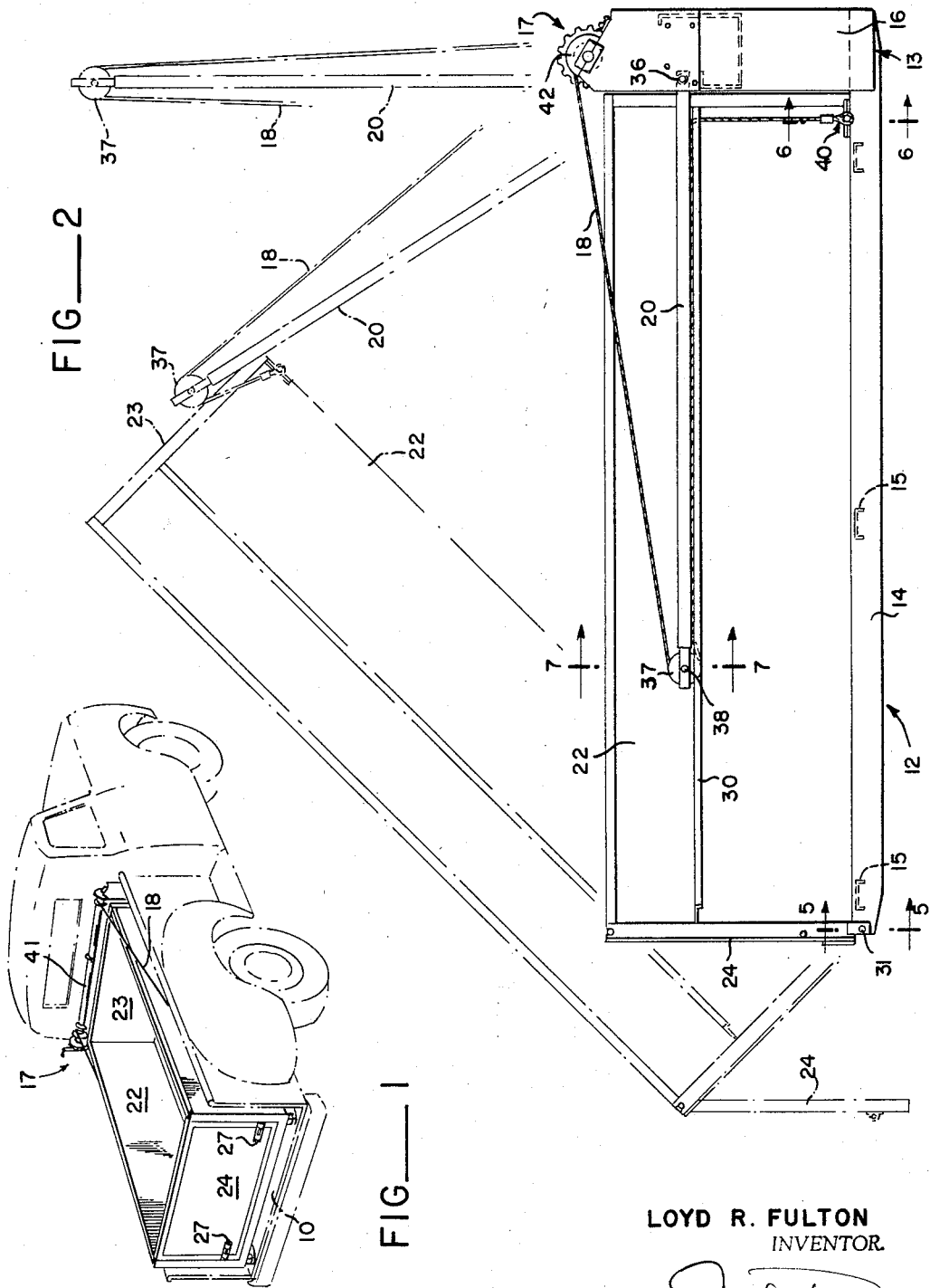
LOYD R. FULTON
INVENTOR.
BY
ATTORNEYS Nov. 19, 1968    L. R. FULTON    3,411,825
DUMP-BODY ACCESSORY FOR PICK-UP TRUCK
Filed Jan. 20, 1967    3 Sheets-Sheet 2
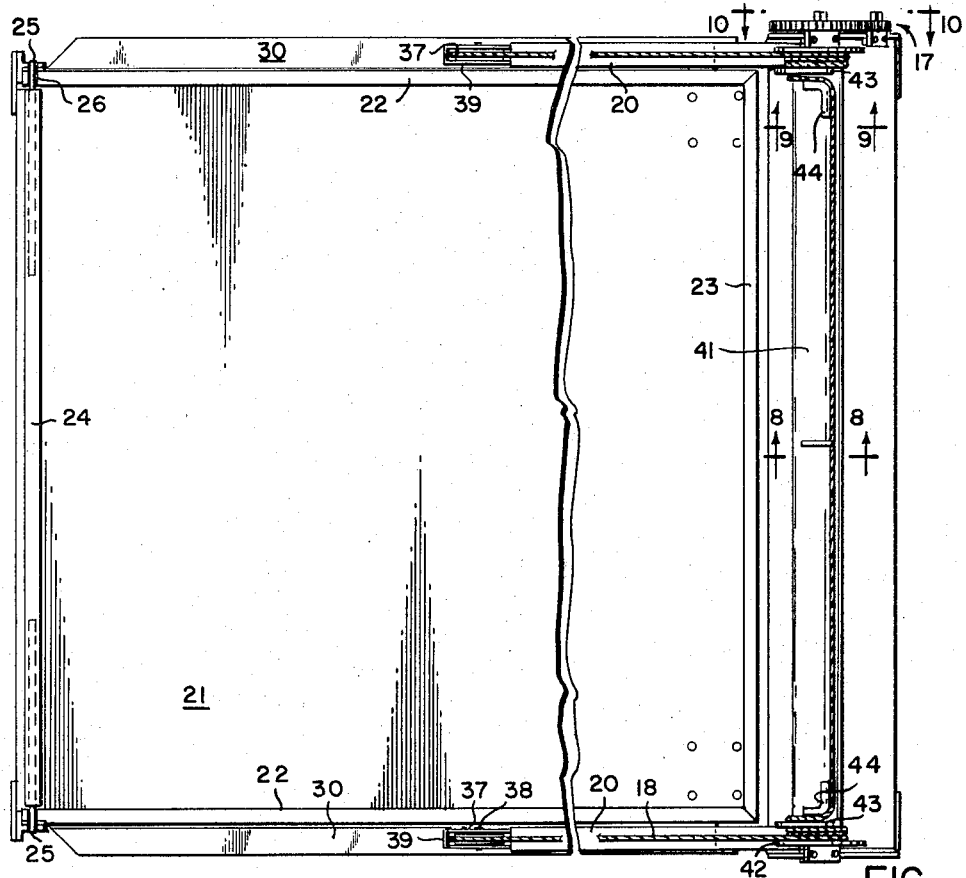
FIG__3
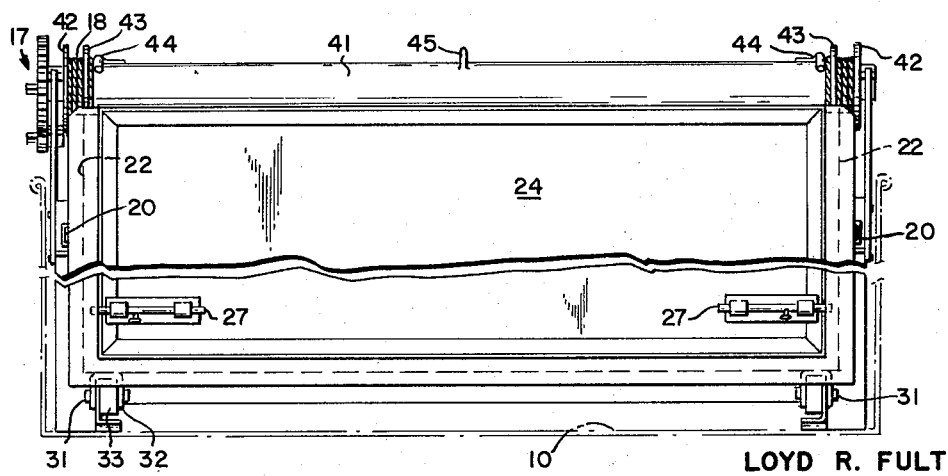
FIG__4
LOYD R. FULTON
INVENTOR.
BY
ATTORNEYS Nov. 19, 1968     L. R. FULTON     3,411,825
DUMP-BODY ACCESSORY FOR PICK-UP TRUCK
Filed Jan. 20, 1967     3 Sheets-Sheet 3
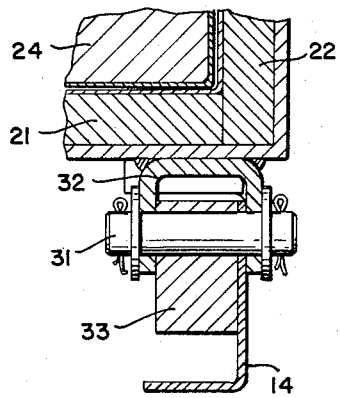
FIG___5
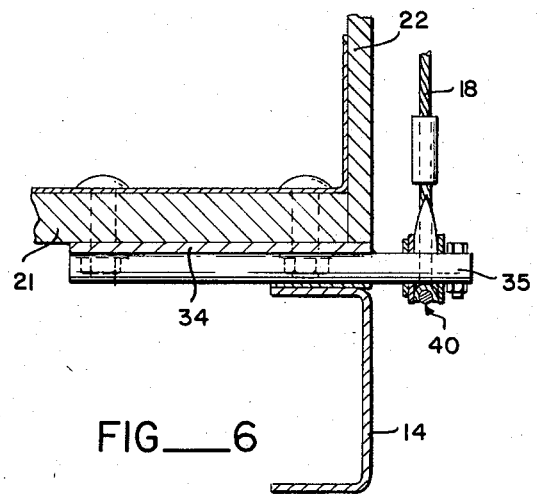
FIG___6
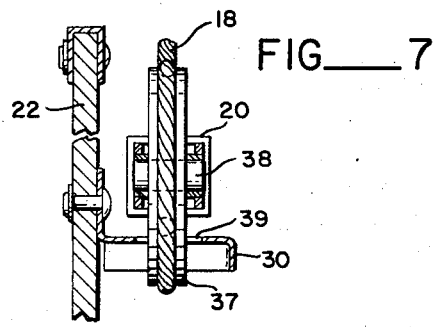
FIG___7
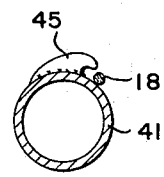
FIG___8
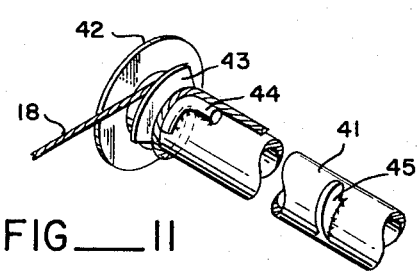
FIG___11
FIG___9
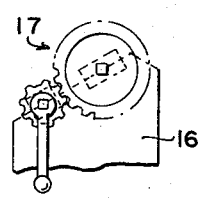
FIG___10
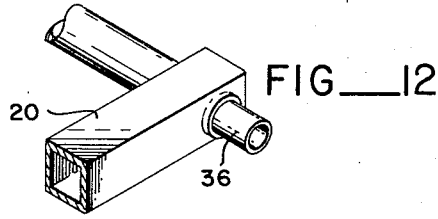
FIG___12
LOYD R. FULTON
INVENTOR.
BY *Seed, Berry
& Downey*
ATTORNEYS

United States Patent Office 3,411,825
Patented Nov. 19, 1968

3,411,825
DUMP-BODY ACCESSORY FOR
PICK-UP TRUCK
Loyd R. Fulton, 9258 Greenwood Ave.,
Seattle, Wash. 98103
Filed Jan. 20, 1967, Ser. No. 610,650
11 Claims. (Cl. 298—19)

ABSTRACT OF THE DISCLOSURE

An accessory dump body structure which is adapted to be used in pick-up type utility trucks to convert the truck to a dump truck. The dump body is pivotally mounted on a skid type bed arranged to be slidably inserted through the open back of the truck. A hand operated winch is attached to a front head-board above the level of the body. The ends of a cable from the winch pass around the ends of booms pivotally mounted to the head-board and resting along each side of the body.

---

This invention relates to accessory equipment for open-top utility trucks of the type commonly referred to as half-ton pick-ups, and pertains more especially to a structure by means of which a utility vehicle of said "pick-up" type can be quickly and easily converted to efficiently perform the function of a dump truck.

The general object of the invention is to provide an accessory dump structure of perfected design which is self-sufficient to perform its intended dump function and which requires no alterations of the utility vehicle in order to adapt the dump structure thereto, being an improvement over the structure illustrated and described in my U.S. Patent No. 3,237,989, issued March 1, 1966.

Said foregoing and other more particular objects and advantages of the invention will appear and be understood in the course of the following description and claims, the invention consisting in the novel construction and in the adaptation and combination of parts hereinafter described and claimed.

In the accompanying drawings:

FIGURE 1 is a perspective view portraying a dump structure constructed to embody preferred teachings of the present invention, the view being combined with a phantom illustration of a conventional half-ton pick-up truck to show the position which said structure occupies when it is installed upon the truck.

FIG. 2 is a side elevational view of the dump structure, employing a scale larger than that of FIG. 1 and indicating by broken lines a hoisted position of the invention's dump box, the view including a broken-line illustration of two upright positions successively occupied by pivoted boom arms incident to hoisting said dump box.

FIG. 3 is a fragmentary top plan view and FIG. 4 is a fragmentary rear elevational view of the dump structure.

FIGS. 5, 6 and 7 are fragmentary transverse vertical sectional views drawn to an enlarged scale on the respective lines 5—5, 6—6, and 7—7 of FIG. 2.

FIGS. 8 and 9 are detail cross-sectional views drawn to an enlarged scale on lines 8—8 and 9—9, respectively, of FIG. 3.

FIG. 10 is a fragmentary detail elevation viewed from the vantage point shown at 10—10 in FIG. 3, employing an enlarged scale but one smaller than that of FIGS. 8 and 9.

FIG. 11 is a fragmentary perspective view of a perfected winch drum on which a cable, for hoisting the dump box, is wound; and FIG. 12 is a fragmentary perspective view showing a root end portion of one of the boom arms, its trunnion-pin mounting, and the cross-connection which ties the two boom arms together.

Referring to said drawings, the half-ton pick-up truck is or may be of the conventional type having a deck 10 walled along the two sides and the front to provide an open-top load-receiving compartment.

The dump body of the present invention is essentially a 2-part structure comprised of (1) a frame, and (2) a dump box which normally rests upon the frame and, for dumping motion, is hinged along its back edge thereto. Said 2-part dump body has a width moderately narrower and a length moderately shorter than the corresponding dimension of the deck, and is arranged to be slidably inserted through the open back of the truck into an operating position upon the deck. Chain tethers (not shown) secure the dump frame in place.

The dump frame is fabricated from stock metal and is comprised of a bed part 12 which rests upon the deck, and a headboard 13 made rigid with the bed and rising therefrom at the front end of the latter. The bed provides stringers 14 extending along each of the two sides, connected at intervals of the length by cross-ties 15. The stringers are moderately bevelled along the underside at each of the two ends and function as skids when inserting and removing the dump body. The head-board is composed of cross-connected cheek-plates 16 located outside the planes in which the outer faces of the stringers lie and rising by preference to a height higher than the side walls of the truck body. A hand-powered winch 17 is attached to the head-board. Associated with a cable 18 which is wound on the winch are two boom arms 20 which are pivoted from the head-board for vertical swing movement about a transverse horizontal axis between a normal lowered horizontal position and a raised upright position. The boom arms raise automatically as a consequence of taking in on the cable. The manner of this operation, which functions to place the boom arms in a position whereat a continued take-in of the cable will lift the dump box into a dumping position, will appear and be understood as the description proceeds.

Like the loading body of the truck itself the dump box of the dump body has a floor wall 21, side walls 22, and a front wall 23, being open at the back and top. Each of these walls are desirably composed of plywood. A suitable thickness is ¾" for the floor wall and ⅜" for the front and side walls. A sheet of metal lines the interior of the box, and the exposed edges of the walls are guarded by metal. A tail gate 24 is provided for the open back of the box, swinging from trunnion pins 25 about the upper edge of the gate as a hinge axis. The trunnion pins seat in open slots 26, permitting the gate to be easily free of the box should it be desired to remove the same. Slide bolts 27 lock the gate in closed position.

Each side wall of the box has a full-length angle-iron riveted to its outer face so as to provide a horizontal flange 30 occupying a level spaced below the upper edges of the side walls.

Hinge pins for the dump box are denoted by 31 and connect each of the frame stringers 14 with a respective one of two fittings 32 bolted to the underside of the dump box. The fittings are formed to an inverted U-shape to connected filler block 33 having a cross-bore to receive straddle the stringers which are each fitted with a weld-the hinge pin.

Adjacent the front end of the dump box at each side thereof there is secured to the underside a plate 34 to which a length of round bar stock has been welded. An end 35 of said bar protrudes laterally beyond a side edge of the dump box.

The two boom arms 20 are joined at the fulcrum by a welded cross-connection to form a unit assembly, and both the side members and the cross-connection are or may be comprised of pipe stock, the latter smaller in diameter and having its two ends received through mating openings drilled diametrically through inner ends of the boom arms. A smaller pipe 36 fitting the hollow center of the cross-connection and protruding by its ends therefrom provides the fulcrum for the boom arms.

Each boom arm has a respective sheave 37 journal-mounted by a pin 38 in the free end for rotation about an axis paralleling the fulcrum 36. When the boom arms occupy a normal lowered position the sheaves lodge in cut-outs 39 which are provided in the flanges 30. The cable 18, hereinbefore referred to, passes over these sheaves. A single cable is employed. In a manner hereinafter described, a median section of the cable is wrapped upon the spooling drum of the winch and the two end sections each take a bight about a respective one of the two sheaves. The overwind run of such end section overlies the boom. The underwind run underlies the boom, extending to the front end limit of the flange 30 and thence passing downwardly to be dead-ended, as at 40, to the protruding bar 35.

Proceeding now to describe the winch 17, its spooling drum 41 is journaled to turn about an axis occupying a level above that occupied by the boom fulcrum 36 and admits of being crank-operated either direct to give a 1 to 1 speed, or through reduction gearing, selectively. At each end of the drum a respective spooling surface, say three cable diameters in width, is defined between a terminal flange 42 and a paralleling guide plate 43 extending through approximately 120° of the drum's circumference. Spaced inwardly from each of the two guide plates is a respective shoulder member 44. Desirably composed of a piece of elbowed pipe, said shoulder members are welded to the drum in positions set inwardly from the guide plates a distance moderately greater than one cable diameter. The cable is attached to the drum by first locating the shoulder members at 3 o'clock, or thereabouts, considered from a vantage point at the starboard side of the truck. A median loop of the cable is then brought over the top of the drum and caught over the shoulder sections so that inner ends of the aforementioned overwind branches of the cable's end sections lie between the shoulder members and the guide plates. Upon now turning the drum in a clockwise direction, this being the "in-wind" direction, the cable ends take their first wraps upon the inboard side of the guide plates and then work, for the second and succeeding wraps, to the outboard side. The guide plates 43, by automatically separating said first and second wraps, preclude disarrangement of the wraps and give to the cable a level-winding action.

The winch drum, at a point central to its length, has a hook 45 welded to the surface. With the cable 18 detached from the drum 41 a drag line (not shown) may be attached to the drum by catching an eyed end thereof over the hook 45. This gives the winch a double-duty function in that it permits loads to be pulled to the truck by winding the drag line onto the drum.

The manner of the dump body's dumping operation is thought to be clear, the initial take-up of the cable causing the boom arms to be moved to an upright position, following which the overhead pull from the cable lifts the front end of the dump box to cause the contents to be dumped.

What is claimed is:

1. A dump structure comprising, in combination with a dump box walled along the front and the sides and having a respective longitudinally extending horizontal flange protruding laterally beyond the outer face of each side wall at a level spaced below the top of the box, a frame on which said box seats and hingedly supporting the latter so that the box can swing upwardly about a transverse horizontal axis located at the rear end thereof from a normal position resting upon the frame into an elevated dumping position, a respective boom arm for each side of the structure fulcrumed to the frame for vertical swinging movement about a coinciding transverse horizontal axis located adjacent the front end of the box from a normal lowered position in which the arm occupies a generally horizontal position seating along side of the box upon the related box flange, with its free end lying to the rear of the fulcrum, into a raised position in which the boom arm stands erect with its free end elevated above the box, a respective sheave carried by said free end of each boom arm for rotation about a transverse horizontal axis, and a respective length of cable for each boom arm taking a bight around the sheave with its underwind end and its overwind end each extending forwardly from the sheave in the approximate swing plane of the boom arm, said underwind end of each cable length being attached to the front end of the dump box, said overwind end being wound upon the spooling drum of a winch mounted from the frame for rotation about a transverse axis occupying a horizontal plane substantially higher than the horizontal plane in which the fulcrum of the boom arms lies, the act of taking in cable upon the spooling drum operating automatically to swing the boom arm from its lowered to its raised position, from which raised position a continued take-in of the cable lifts the box into its dumping position.

2. Structure as claimed in claim 1 in which the box attachment of the cable which is related to each boom arm is made by running the cable from the sheave of the lowered boom forwardly to and over the front end of the related flange and thence downwardly to an anchor pin protruding laterally from a fitting secured to the underside of the box.

3. Structure as claimed in claim 1, sized so as to seat upon the loading deck of a pick-up truck with said flanges within the truck body and removable therefrom so as to be an accessory therefor.

4. Structure as claimed in claim 3 in which the frame presents stringers extending along each of the two sides and acting as skids when applying the structure to and removing the structure from the truck.

5. Structure as claimed in claim 1 having a tail-gate for the open rear end of the box swingable from trunnion pins about the upper edge of the gate as an axis with the trunnion pins seating in open slots so that the gate may be removed by lifting said pins free of the slots.

6. Structure as claimed in claim 1 in which the frame presents on-edge channel-iron stringers extending along each of the two sides, the fulcrum connection between the box and the frame comprising, at each of the two sides of the structure, an inverted-U fitting secured to the underside of the box with its side arms straddling the related channel-iron and a filler block welded thereto and having said side arms, the channel-iron, and the filler block traversed by a hinge pin.

7. Structure as claimed in claim 1 in which a single cable provides both of said cable lengths and is removably attached to the spooling drum by hooking a looped median portion of the cable over two shoulder members which are made a projecting fixed part of the drum, one located in the approximate swing plane of one boom arm and the other located in the approximate swing plane of the other boom arm.

8. Structure as claimed in claim 7 having means upon the spooling drum for attaching a drag line thereto.

9. Structure as claimed in claim 7 having divider means upon the spooling drum for separating a first wrap from succeeding wraps of the cable ends.

10. Structure according to claim 1, each flange having a cut-out in which the sheave of the related boom lodges when the boom is seated upon the flange.

11. A dump structure comprising, in combination with a dump box walled along the front and the sides, a frame on which said box seats and hingedly supporting the latter so that the box can swing upwardly about a transverse horizontal axis located at the rear end thereof from a normal position resting upon the frame into an elevated dumping position, a respective boom arm for each side of the structure fulcrumed to the frame for vertical swinging movement about a coinciding transverse horizontal axis located adjacent the front end of the box from a normal lowered position in which the arm occupies a generally horizontal position, with its free end lying to the rear of the fulcrum, into a raised position in which the boom arm stands erect with its free end elevated above the box, a respective sheave carried by said free end of each boom arm for rotation about a transverse horizontal axis, and a respective length of cable for each boom arm taking a bight around the sheave with its underwind end and its overwind end each extending forwardly from the sheave in the approximate swing plane of the boom arm, said underwind end of each cable length being attached to the front end of the dump box, said overwind end being wound upon the spooling drum of a winch mounted from the frame for rotation about a transverse axis occupying a horizontal plane substantially higher than the horizontal plane in which the fulcrum of the boom arms lies, the act of taking in cable upon the spooling drum operating automatically to swing the boom arm from its lowered to its raised position, from which raised position a continued take-in of the cable lifts the box into its dumping position, divider means being provided upon the spooling drum for separating a first wrap from succeeding wraps of the cable lengths, a single cable providing both of said cable lengths and being removably attached to the spooling drum by hooking a looped median portion of the cable over two shoulder members which are made a projecting fixed part of the drum, one located in the approximate swing plane of one boom arm and the other located in the approximate swing plane of the other boom arm.

References Cited

UNITED STATES PATENTS

| | | | |
|---|---|---|---|
| 1,457,575 | 6/1923 | Jansen | 298—19 |
| 1,746,079 | 2/1930 | Hallenbeck | 298—19 |
| 2,573,478 | 10/1951 | McKendrey | 298—19 |
| 2,033,209 | 3/1936 | Teetor | 298—19 |
| 3,237,989 | 3/1966 | Fulton | 298—19 |

FOREIGN PATENTS 8,090   5/1928   Australia.

RICHARD J. JOHNSON, *Primary Examiner.*